United States Patent [19]

Chang

[11] Patent Number: 4,867,603
[45] Date of Patent: Sep. 19, 1989

[54] DEVICE FOR PREVENTING FLOODING CAUSED BY SPRINKLER FAILURE

[76] Inventor: Shih-Chih Chang, 2339 Davison Avenue, Richland, Wash. 99352

[21] Appl. No.: 304,608

[22] Filed: Feb. 1, 1989

[51] Int. Cl.[4] .................. F16K 21/10; F02B 11/00
[52] U.S. Cl. ........................................ 405/37; 405/36; 137/514.3; 137/514.7; 137/517; 239/570
[58] Field of Search ............... 405/36, 37, 40, 41; 137/460, 514.3, 514.7, 517; 239/570, 571

[56] References Cited

U.S. PATENT DOCUMENTS

| | | | |
|---|---|---|---|
| 3,337,213 | 4/1968 | Billington | 137/517 |
| 3,540,469 | 11/1970 | Ward | 137/517 |
| 3,735,777 | 5/1973 | Katzer et al. | 137/514.5 |
| 4,131,235 | 12/1978 | Lieding | 239/570 |

Primary Examiner—Dennis L. Taylor
Assistant Examiner—Arlen L. Olsen

[57] ABSTRACT

A device for protecting irrigation land local flooding caused by damaged sprinklers or broken risers. The device, in accordance with the present invention is designed to be situated within a piping component upstream of each individual sprinklers and it is completely enclosed within the piping component. The device detects and responds to the excess flow caused by damaged sprinkler or broken riser by shutting off water to the damaged sprinkler. In so doing, the device allows the remainder of the irrigation circuit to operate without interruption, albeit temporarily without the service of the damaged sprinkler. The device has no external housing and therefore the component itself is not vulnerable to physical damage from outside. The device has a delayed shut-off mechanism which allows it to identify transient flow surges which accompany many sprinkler systems start-ups and the elevated flow resulting from damage to a sprinkler branch and it also has the capability to clean out debris which might collect in the pipe line.

11 Claims, 2 Drawing Sheets

DEVICE FOR PREVENTING FLOODING CAUSED BY SPRINKLER FAILURE

BACKGROUND OF THE INVENTION

Irrigation by one means or another is necessary to grow agricultural products or to maintain landscape plants and lawns for a large portion of the United States. In 1986 sprinkler irrigation was employed for nearly 24 million acres of agricultural land in the United States and it remains the most common form of irrigation for lawns and landscaping. The introduction of relatively inexpensive control systems for sprinklers has resulted in the extensive use of automatic lawn and landscape sprinkling systems. While the automatic sprinkling system increases the ease of maintaining the lawn or landscaping, it also increases the problem of local flooding caused by missing sprinkler heads or broken sprinkler risers. Monitoring for sprinkler failures and repairing them is necessary to prevent the flooding and damage that could occur and adds an additional maintenance expense to the operation of a sprinkler irrigation system.

In a typical sprinkler irrigation system, main water supply pipes carry water throughout the system and individual sprinkler branches are distributed along the pipes. Each individual sprinkler branch consists of a riser and a sprinkler head. The riser, a short length of vertical pipe provided to elevate the sprinkler head to the desired level above the ground, is connected to the supply pipe by a tee, or an elbow, and the sprinkler head is attached to the top of the riser.

The flow of water out of a sprinkler head is limited by the design of the sprinkler when the sprinkler is operating normally, that is with the sprinkler head and the riser intact. In the event the sprinkler head is missing or the riser is broken, the water will flow out of the affected branch at a much higher rate. In addition to the potential flooding and damage to soil and crops caused by the excess flow, the remainder of the system will not function properly because of the flow lost to the damaged sprinkler. As a rule, the it is important to allow the debris to flush out through the device before putting the damaged sprinkler back in line. Then the system can be cleaned easily after a sprinkler break incident. The devices in the state of the art do not have such self-cleaning capability and they require a troublesome procedure to remove the debris once they fall in the piping through the break. This is one reason that the existing devices are not commonly adopted by the users.

Another crucial functional requirement for the shut-off device in a sprinkler irrigation system is the need to differentiate between the high transient flow surges normally experienced during start-up and the high flow due to a break in the sprinkler branch. These flow surges, which quite often exceed the threshold flow, are caused by air which has entered the irrigation piping while the system was off. The air, which replaces the water normally present during operation, can flow out of the sprinkler head at a higher volumetric rate than can the water it is replacing and the flow surges until the air is discharged. The automatic shut-off device must not actuate as a result of this flow surge.

The design of the disclosed device takes advantage of the difference between these surges and a broken sprinkler branch. During the start-up of a sprinkler irrigation system there may be several flow surges, each of very short duration. The difference between the flow surges and the broken sprinkler branch is the transient nature of the flow surges. Flow from a broken sprinkler branch increases above the threshold are remains there indefinitely, whereas the flow during start-up may increase above the flow threshold but almost immediately returns to nearly normal flow rates.

The disclosed device includes a damping mechanism incorporated in the shut-off device which delays the action of the shut-off mechanism and prevents the temporary flow surges from actuating the shut-off mechanism, thereby allowing the system to start up normally. At the same time, the delay action of valve closure can service for the self-cleaning purpose which allows the trapped debris to pass through before the water is stopped. There are shut-off devices which utilize some form of damping mechanism, for example, the device described in U.S. Pat. No. 3,735,777. However the damping mechanism has been included for a different purpose, namely for mitigating the "water hammer" effect which would result form an abrupt closure of the shut-off device. Cleaning debris and by-passing start-up surges requires a much longer closure time than is required to mitigate the water hammer.

OBJECTS OF THE INVENTION

The main object of the present invention is to provide a device for protecting against water damage caused by missing sprinkler heads or broken risers in a sprinkler irrigation system.

A specific object of the present invention is to provide a device which, when installed in a sprinkler irrigation system, is entirely enclosed within the piping of the sprinkler irrigation system so that it does not act as a pressure boundary component and is therefore not vulnerable to physical damage form the outside and cannot become the cause of a break in the sprinkler branch.

Another specific object of the present invention is to provide a device which can be installed in a sprinkler irrigation system without alteration to piping lengths in the original system Still another specific object of the present invention is to provide a device which, by not having a separate housing as a pressure boundary of the sprinkler irrigation system, provides significant manufacturing cost reduction which consequently improves the economics to be adopted as a standard component for irrigation applications.

Still another specific object of the present invention is to provide a device having self-cleaning capability which can flush out debris from the pipe line.

Still another specific object of the present invention is to provide a device which has a prolonged closure which prevents the temporary flow surges from actuating the closure, thereby allowing the sprinkler irrigation system to start up normally.

SUMMARY OF THE DISCLOSURE

The disclosed invention involves an automatic shut-off device which is designed to be installed inside an individual sprinkler branch. Said device consists a flow shut-off mechanism which is actuated when the flow through the sprinkler branch exceeds a predetermined threshold. This flow threshold is significantly higher than the flow for normal operation with the riser and sprinkler head intact, but lower than the elevated flow associated with a break in the sprinkler branch. With the sprinkler head and riser intact the flow is below the threshold for actuation of the flow shut-off mechanism and it remains open allowing the water to flow through the sprinkler branch. In the event the sprinkler head is missing, or the riser is broken, the discharge flow from the broken sprinkler branch exceeds the threshold flow rate and the shut-off mechanism is actuated automatically and the discharge flow from the broken branch is stopped.

The working principle of the present invention is based on the increased hydrodynamic drag associated with the flow increasing from normal sprinkler flow to the abnormally high flow corresponding to a damaged sprinkler branch. The abnormally elevated flow is controlled by a automatic shut-off device, in accordance with the present invention. The hydrodynamic drag force of the water flow acts on a movable plug means situated in the flow path, which is prevented from contacting a seating means by the action of a mechanical spring. The spring is so selected that it will not be compressed enough to seat a moveable flow plug by the pressure applied as a result of normal sprinkler flow, but it will be compressed enough to allow the plug to seat by the pressure which results from flows greater than the threshold flow.

An unique feature of the disclosed device, which distinguishes it from the prior art, is that it does not have its own housing. The entire device is enclosed in existing components of the sprinkler branch, for example the riser and the tee. This not only eliminates the potential for the device to be broken but also drastically reduces the manufacturing costs and simplifies the installation of the device in existing systems. The installation of this device between the tee and the riser does not change the height of the sprinkler head. This feature is particularly advantageous for after-market applications. A design with a housing installed would result in the height of the sprinkler head being increased by the length of the housing unless the existing riser was shortened or replaced with a shorter riser. The disclosed device can be added to an existing sprinkler irrigation system without the need of changing any of the piping components.

Another unique feature of the disclosed device is that it includes a damping mechanism. The damping delays the closing action of the plug and thereby preventing the plug from seating as a result of a temporary flow surge during the start-up of the sprinkler irrigation system. The damping mechanism also provides also the desired self-cleaning capability which allows the water flow to expel debris through the device before its closure.

Because of all of the advantages of the disclosed invention, I believe it the potential to become a standard component for new sprinkler irrigation systems and for after-market addition to existing sprinkler irrigation systems. It can thus effect millions of acres of agricultural land across the country and most domestic uses of water sprinklers.

DETAILED DESCRIPTION OF THE PREFERRED EMBODIMENTS

Figure 1:
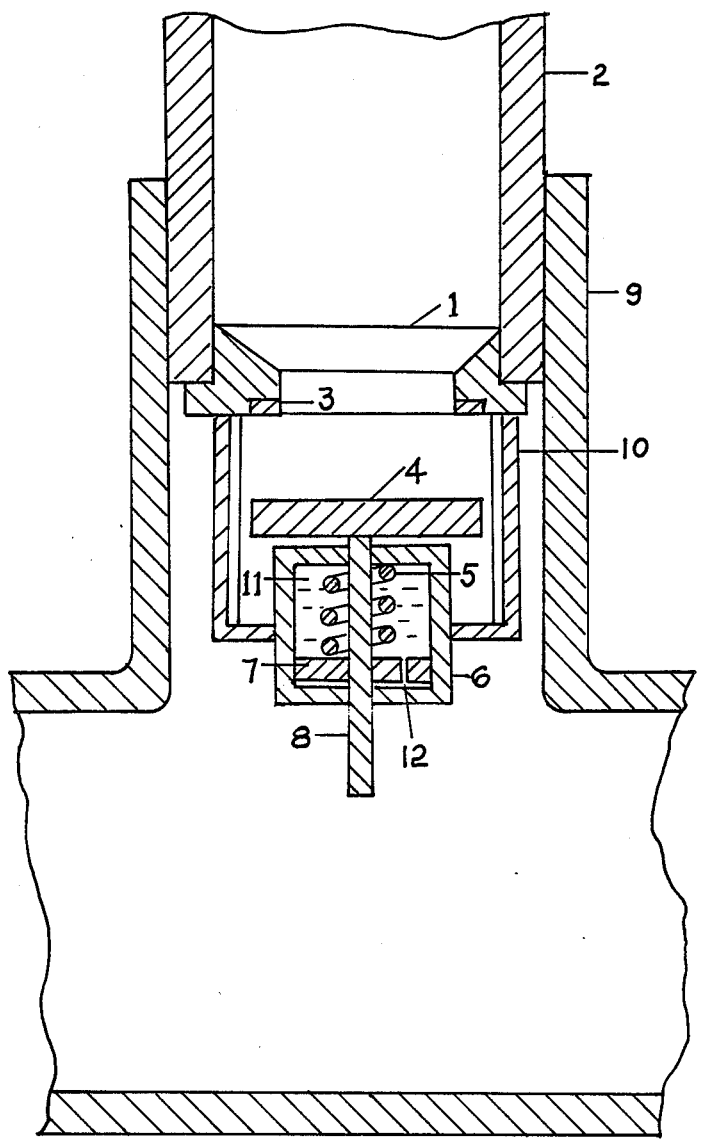
FIG. 1 is a cross-sectional view of a preferred embodiment of the disclosed flooding prevention device installed in a sprinkler irrigation system.

Referring to FIG. 1, the flooding prevention device has an fitting means 1 which is designed such that its outer diameter fits tightly to the inner diameter of the riser 2. There is a valve seat 3 affixed to the fitting means. The plug 4 is movable in the axial direction and it is positioned upstream of the valve seat. The spring means 5 provides a mechanical force to keep the plug away from the valve seat under normal flow rates so that the water can flow through the opening between the plug and the valve seat. There is a dashpot means which consists of a cylinder 6, piston 7, and piston rod 8. The cylinder is affixed to the fitting means by the supporting legs 10. The interior of the cylinder is filled with a viscous fluid 11 and there are narrow flow paths 12 communicating between the two sides of the piston. The piston is attached to the plug. Because the piston must move with the plug, a portion of the fluid in the cylinder is forced to flow from one side of the piston to the other whenever the plug moves. As a consequence the speed of the moving piston is limited by the volumetric rate of flow of the fluid through the narrow flow paths and the flow resistance through the narrow flow paths results in a damping force which resists movement of the plug.

Under normal conditions the water flows from the tee joint 9, around the plug, and exists through the outlet port. Hydrodynamic drag on the plug arising from the flow tends to drive the plug toward the valve seat. This force, which is approximately proportional to the second power of the flow rate, is transmitted to the spring by the piston and causes a compression of the spring. The spring is so designed that it can support the drag force resulting from normal flow, but not the force arising from flows substantially greater than normal. In the case of a missing sprinkler nozzle, or when the riser is broken, the flow increases substantially, resulting in an even greater increase in the hydraulic drag since the drag increases as the second power of the flow. This increased drag can overcome the spring force and, by pushing the plug towards the outlet port, eventually cause the plug to contact the valve seat. Thus, the flow disclosed shut-off device will remain open and not affect normal operation with intact risers and sprinkler heads, but it will close and shut off the water flow in the event either the sprinkler head is missing or the riser is broken.

The damping force of the dashport controls the rate of movement of the plug by limiting the rate at which the plug can respond to the hydraulic drag forces applied to it. In order to function properly for the purpose intended by the disclosed invention the dashpot must be so designed that it provides enough damping to prevent the shut-off mechanism from closing as a result of the temporary flow surge during start-up of the sprinkler irrigation system. The damping capability is determined by the dimensions of the narrow flow paths through the piston and the viscosity of the fluid in the cylinder. It is anticipated that different dashpot designs will be necessary for sprinkler irrigation systems with different start-up characteristics. As an example, consider a sprinkler irrigation system with long, sloping lateral pipes. The water easily drains when the sprinkler irrigation system is shut off. Such systems have longer and more severe flow surges and nee a dashpot which will provide a slower rate of closure. It is of considerable significance to note that the end of riser is secured within the tee and that this method of construction provides the ideal configuration in which to apply the disclosed device. In this configuration the end of the upstream pipe (the riser) can be used as a support into which the disclosed device can be inserted. Because the upstream tee must have a substantially larger inside diameter than the riser, the disclosed device can be designed to produce only a minimal resistance to the water flow. More importantly, the location of the device upstream of the attachment between the tee and the riser prevents it from failing even when the entire riser and sprinkler head are broken off. It can continue to function because when a pipe break occurs, the most frequent location is the neck of the fitting, which is just downstream of the attachment between the tee and the riser. The disclosed device, being installed between the riser and the tee, will remain intact after a break in the sprinkler branch and will perform its desired function.

Figure 2:
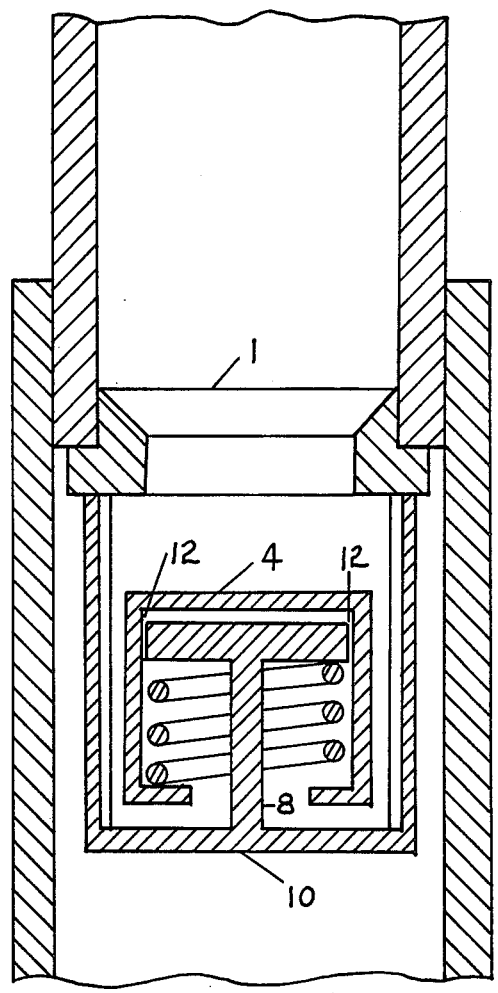
FIG. 2 is a cross-sectional view for another preferred embodiment of the disclosed flooding prevention device with a integrated dashpot design.

FIG. 2 shows another preferred embodiment of the disclosed invention with a dashpot design which is integrated with the moveable plug. The plug 4 has a body with a central cavity. The end of the cavity which faces the value seat is closed and the upstream end is open. A stationary piston 7 is fitted within the cavity such that it confines motion of the plug to the axial direction. The upstream end of the piston, the end farther away from the valve seat, is connected to a piston rod 8 which is mechanically affixed to the fitting 1 through supporting legs 10. To shut off the flow, the plug moves towards the valve seat which increases the volume of the space between the piston and the plug and reduces the pressure within the space. Water will be drawn into the space between the piston and the plug through the narrow flow paths 12 the inner walls to fill the space. In this arrangement the flow path is provided by the gaps between the piston and the inner walls of the cavity. The hydraulic resistance of the flow through narrow paths provides a damping force which in turn limits the speed of the plug and the provides desired length of time require for the valve closure.

One unique feature of this dashpot design is that it employs an expanding volume and the force associated with the reduced pressure within the expanding volume for damping. This feature is differentiable from dashpot devices which generally contain the working fluid within a chamber and rely on expelling the working fluid from the chamber to generate the desired damping force. This unique feature of the disclosed invention provides a particular advantage because of the special conditions which are often present in sprinkler irrigation systems. Sprinkler piping can drain when the system is not operating, as can a dashpot which uses the irrigation water as a working fluid. A dashpot which relies on expelling trapped water is not desirable for application in many sprinkler irrigation system since it must have the dashpot filled with water in order to function properly, because air flow resistance is substantially lower than water. A dashpot designed with a suction action, as disclosed above, can function even when it has been drained because the shut-off mechanism will not attempt to close until water reaches the device, at which time the disclosed dashpot has a supply of intake water from the piping. Thus the piping is refilled with water and the action of the dashpot is required, it will function as intended.

I claim:

1. A device for protecting an irrigated area against local flooding caused by an abnormal elevated flow from a damaged branch of an irrigation piping system being enclosed within at least one component of said piping system comprising;
    an automatic flow shut-off means included in said at least one component which is adapted to allow flows lower than a preset flow threshold to pass therethrough and to automatically shut off flows which are higher than said pre-set flow threshold, said flow threshold being higher than a normal pipe water flow and lower than said abnormal elevated flow resulting from said damaged branch of said irrigation piping system;
    said automatic flow shut-off means including a damping means which is adapted to allow temporary flow surges of short durations to bypass during a start-up of said irrigation piping system and shut-off during a period in which said flow threshold is exceeded;
    said shut-off means including a movable plug means, a stationary valve seat and a spring means; water being transmitted to said piping component, flowing around said plug means; said plug means being positioned upstream of said valve seat and being movable toward said valve seat, said spring means being installed such that it exerts a mechanical force on said plug means against the motion of said plug means towards said valve seat; a cross-section of said plug means being substantially smaller than a cross-section of said inner diameter of said piping component such that a flow gap is formed between the inner walls of said piping section and the outer walls of said plug means so that said water can flow freely through said gap; said spring force being sufficiently large to compensate the hydraulic force on said plug means from normal flow of said water when said piping branch is intact and said spring force being smaller than the hydraulic force from said abnormal elevated flow caused by said damaged sprinkler, thus said spring force keeping said plug means substantially distant from said valve seat under normal flow condition to allow said water to flow through when said piping branch being intact and , in the event of said piping branch being damaged and causing said abnormally elevated flow, said hydraulic force of said abnormally elevated flow overcoming said spring force and allowing said plug means to contact said valve seat and thereby shutting off said abnormally elevated flow through said piping component, said damping means for extending duration of valve closing being a dash-pot means which is mechanically connected with said plug means; said dashpot means producing a resistance force against the motion of said plug means and thereby slowing down the closing motion of said plug means.

2. A device as in claim 1, said plug means has a cylindrical cavity with the down-stream end being closed; said dashpot means being formed by a stationary piston fitted in a cylindrical cavity of said plug means such that a motion of said plug means towards said valve seat tends to increase the volume confined by said piston in said cavity; tending to increase the volume confined by said piston in said cavity; a small flow path being provided for communicating the interior and exterior of said volume; said increase of said volume forcing a water flow into said volume through said small flow path which consequently producing a damping force against said closing motion of said plug means.

3. A device as in claim 2 said small flow path being the gap of a predetermined dimension between said piston and the inner walls of said cylindrical cavity.

4. A device for protecting an irrigated area against local flooding caused by an abnormal elevated flow from a damaged branch of an irrigation piping system being enclosed within at least one component of said piping system comprising;
   an automatic flow shut-off means including in said at least one component which is adapted to allow flows lower than a pre-set flow threshold to pass therethrough and to automatically shut off flows which are higher than said pre-set flow threshold, said flow threshold being higher than a normal pipe water flow and lower than said abnormal elevated flow resulting from said damaged branch of said irrigation piping system;
   said automatic flow shut-off means including a damping means which is adapted to allow temporary flow surges of short durations to bypass during a start-up of said irrigation piping system and shut-off during a period in which said flow threshold is exceeded;
   said damping means including a plug means, a cylinder filled with a fluid, and a piston enclosed within said cylinder, said piston being attached to a piston rod wherein said piston has at least one narrow flow path therethrough such that a displacement of said piston forces a flow of said fluid from a first side of said piston to a second side of said piston through a narrow flow path;
   said at least one component of said piping system includes a male inlet fitting and at least a portion of said flow shut-off means is inserted into said male inlet fitting of said pipe section.

5. A device as in claim 1 wherein said shut-off means is adapted to provide the capacity of flushing out debris inside piping system.

6. A device as in claim 3 wherein said duration of shut-off action is longer than one second.

7. A device as in claim 1 wherein said pipe section is a sprinkler riser.

8. A device as in claim 1 including a piping tee in which said male inlet fitting is inserted.

9. A device as in claim 1 including a piping elbow in which said male inlet fitting is inserting.

10. A device as in claim 1 comprising an interference fit to the inner diameter of said piping component so that said flow shut-off means is secured by said piping component.

11. A device as in claim 12, said small flow path being a narrow flow path penetrating through said piston.

* * * * *